Oct. 20, 1942.   W. J. BRUSKE   2,299,375
FISHING TACKLE BOX
Filed Aug. 26, 1941   3 Sheets-Sheet 1

Inventor
Walter J. Bruske

By Clarence A. O'Brien
Attorney

Oct. 20, 1942.   W. J. BRUSKE   2,299,375
FISHING TACKLE BOX
Filed Aug. 26, 1941   3 Sheets-Sheet 2

Inventor
Walter J. Bruske
By Clarence A. O'Brien
Attorney

Oct. 20, 1942.  W. J. BRUSKE  2,299,375
FISHING TACKLE BOX
Filed Aug. 26, 1941  3 Sheets-Sheet 3
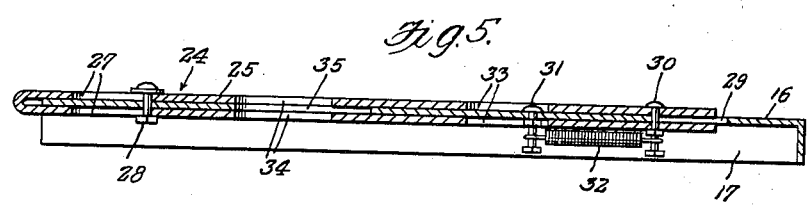
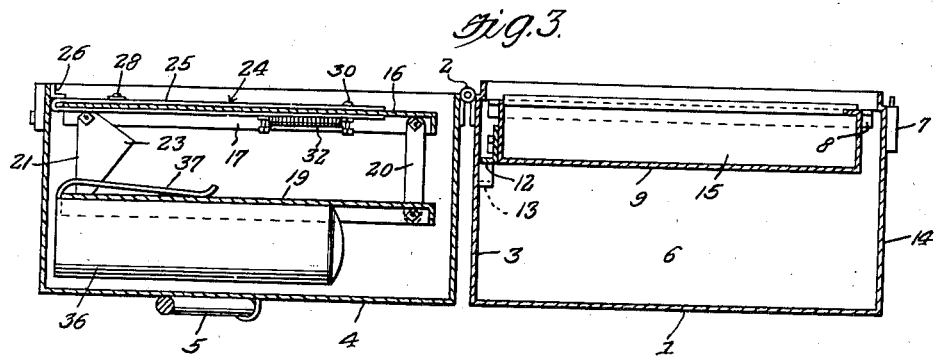
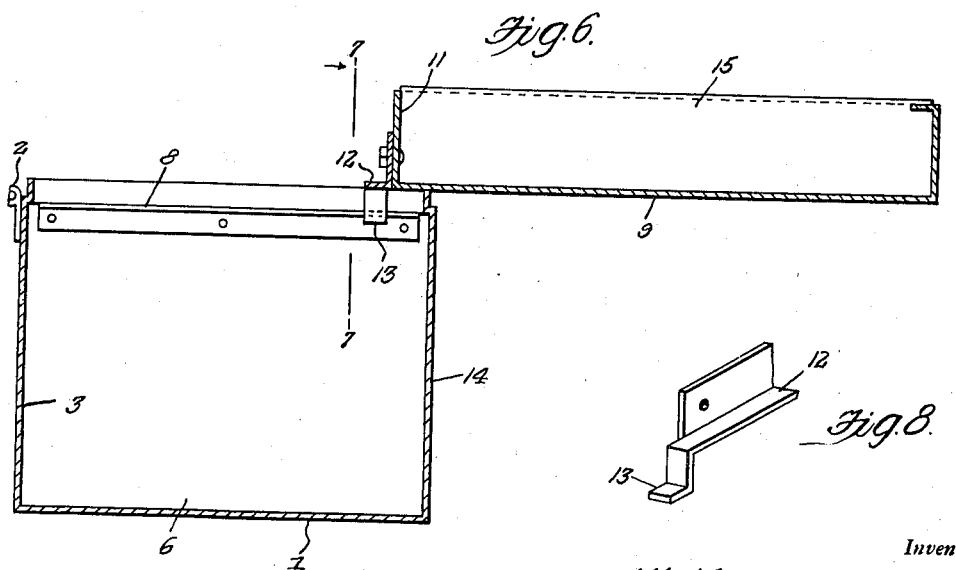
Inventor
Walter J. Bruske
By Clarence A. O'Brien
Attorney Patented Oct. 20, 1942

2,299,375

UNITED STATES PATENT OFFICE 2,299,375

FISHING TACKLE BOX

Walter J. Bruske, Fall Creek, Wis.

Application August 26, 1941, Serial No. 408,382

2 Claims. (Cl. 43—31)

The present invention relates to new and useful improvements in fishing tackle boxes and has for its primary object to provide, in a manner as hereinafter set forth, a device of this character comprising a plurality of folding shelves of a novel construction and arrangement adapted to support a plurality of artificial bait cases whereby a selection of the artificial baits may be quickly and conveniently made.

Another important object of the invention is to provide a fishing tackle box of the aforementioned character which embodies unique means for latching the shelves in inoperative position and for swinging said shelves to raised or operative position.

Still another very important object of the invention is to provide, in a fishing tackle box comprising a removable tray, novel means for supporting said tray in an out of the way position when access to the box is desired.

Other objects of the invention are to provide a fishing tackle box of the character set forth which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Fig. 3 is a vertical sectional view, taken substantially on the line 3—3 of Fig. 2.

Fig. 5 is a view in vertical section through the latch, taken substantially on the line 5—5 of Fig. 2.

Fig. 6 is a view in vertical section taken substantially on the line 6—6 of Figure 2, through the box and tray, showing the latter in the position in which it is placed when access to said box is desired.

Fig. 8 is a detail view in perspective, showing the means for retaining the tray in the position illustrated in Fig. 6 of the drawings.

Figure 1:
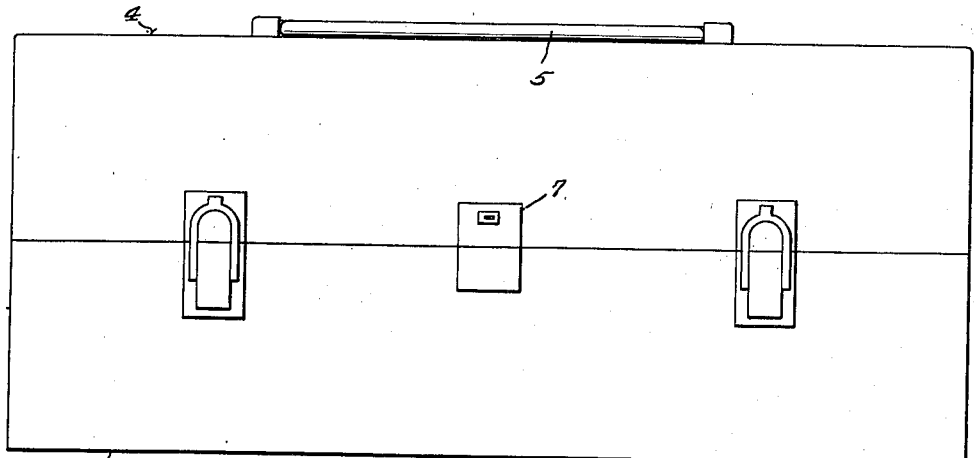
Figure 1 is a view in front elevation of a fishing tackle box constructed in accordance with the present invention.

Referring now to the drawings in detail, it will be seen that the embodiment of the invention which has been illustrated comprises a sheet metal box 1. Hingedly mounted at 2 on the back 3 of the box 1 is a cover 4. A carrying handle 5 is provided on the top of the cover 4. A suitable lock 7 secures the cover 4 in closed position on the box 1.

Mounted on the upper portions of the side walls 6 of the box 1 are flanges 8. The flanges 8 constitute supports for a tray 9 in the box 1. Toward this end the tray 9 is provided, on its ends, with flanges 10 which rest on the flanges 8. Secured to the back 11 of the tray 9 is a bar 12. The bar 12 terminates in downwardly offset end portions constituting hooks 13 which are engageable beneath the flanges 8 for supporting the tray 9 in an out of the way position on the front 14 of the box 1 when access to said box is desired. This is shown to advantage in Fig. 6 of the drawings. The tray 9 is for the reception of miscellaneous articles and is divided into a plurality of compartments by partitions 15.

Mounted for swinging movement in the cover 4 is a metallic shelf 16. The shelf 16 is provided, on its ends, with integral flanges 17 which are pivotally secured at 18 to the side walls of the cover 4 adjacent the hinged inner end of the latter. Mounted for swinging movement on the shelf 16 is another shelf 19. Pairs of links 20 and 21 pivotally connect the shelf 19 to the shelf 16. The same pivots 18 which secure the shelf 16 to the cover 4 connect the links 20 to said shelf 16. The links 21 are coupled to the shelf 19 through the medium of pin and slot connections 22. The links 21 are formed to provide brackets or the like 23 which are engageable with the shelf 16 (see Fig. 4) for supporting the shelf 19 in spaced relation to said shelf 16.

Figures 4, 9:
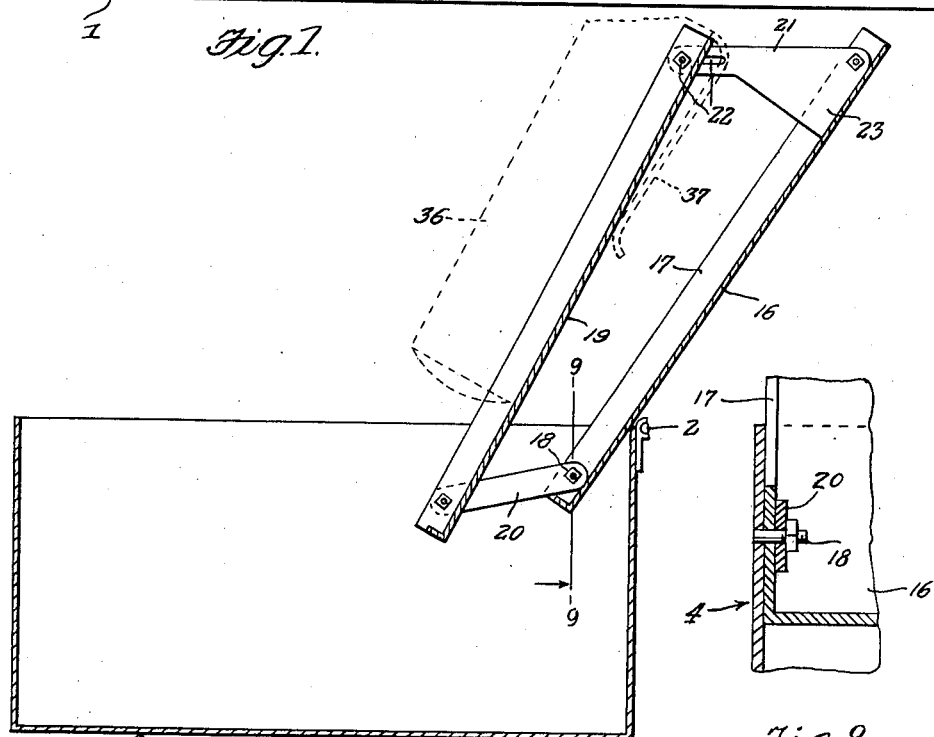
Fig. 4 is a vertical sectional view through the cover, taken substantially on the line 4—4 of Figure 2, showing the shelves in operative position.
Figure 9 is a vertical sectional view, taken substantially on the line 9—9 of Figure 4.
Figure 2:
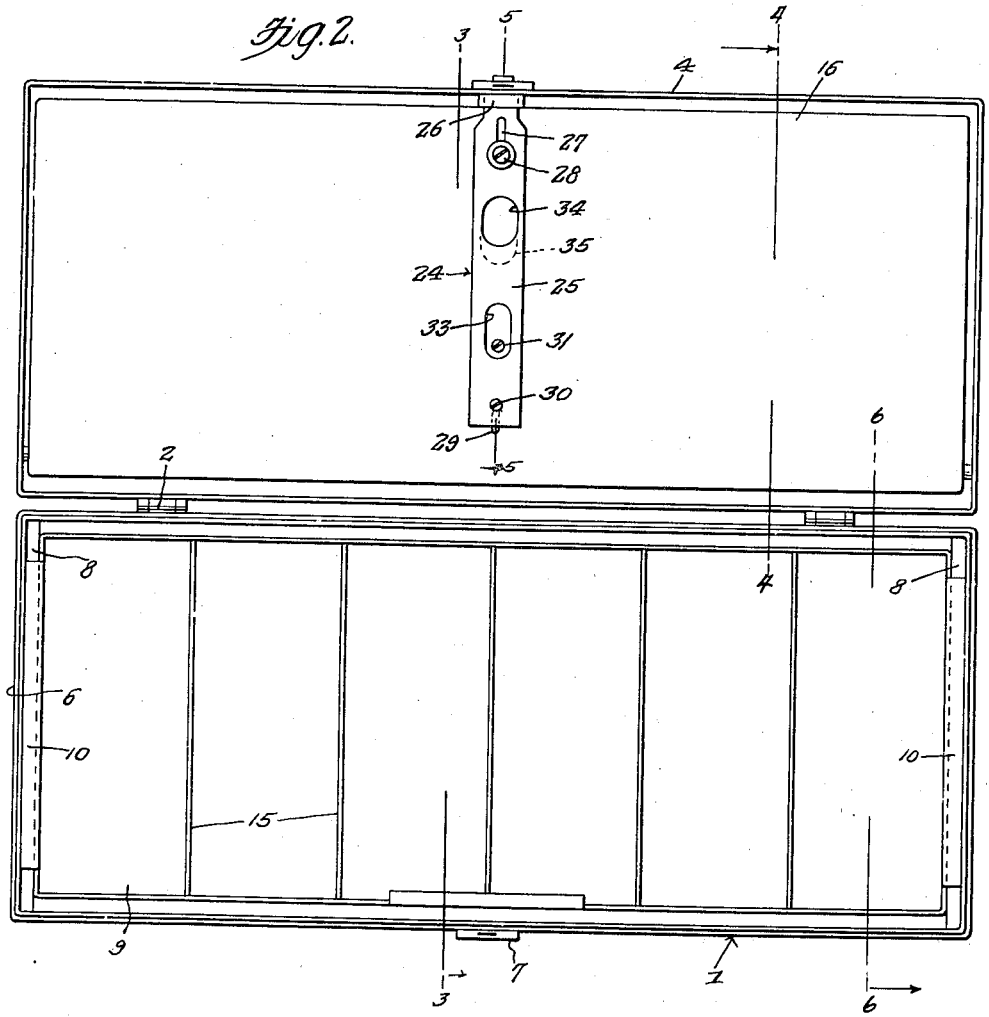
Fig. 2 is a top plan view, showing the box open.
Figure 7:
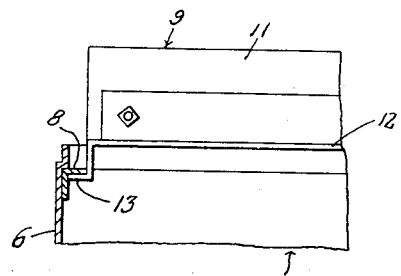
Fig. 7 is a detail view in vertical section, taken substantially on the line 7—7 of Fig. 6.

As best seen in Fig. 3 of the drawings, the cover 4 encloses the shelves 16 and 19 when said shelves are in inoperative position. When the shelves are raised to open or operative position, as seen in Fig. 4 of the drawings, the weight thereof is swung past center and the shelf 16 rests on the hinged edge of the cover 4.

A latch 24 releasably secures the shelves 16 and 19 in inoperative position in the cover 4. The latch 24 comprises a strip of suitable metal which is bent upon itself in a manner to provide a substantially U-shaped bolt 25 which is slidably mounted on the shelf 16. The bight portion of the substantially U-shaped bolt 25 projects beyond the free end of the shelf 16 for engagement with a keeper 26 which is provided therefor on the free end of the cover 4. Formed in the outer end portion of the bolt 25 are longitudinal slots 27. The slots 27 accommodate a guide and stop bolt 28 which is mounted in the shelf 16.

The inner portion of the shelf 16 has formed therein a slot 29. Mounted on the bolt 25 and projecting therefrom is a pin or the like 30 which is operable in the slot 29. Mounted in the shelf 16 between the slot 29 and the bolt 28 is a pin 31. A coil spring 32 is connected to the pins 30 and 31 for projecting the bolt 25. Elongated openings 33 in the legs of the substantially U-shaped bolt 25 accommodate the pin 31. Also formed in the bolt 25 are finger openings 34. The openings 34 are in communication with an elongated opening 35 in the shelf 16. Thus, a finger inserted in the openings 34 is permitted to retract the bolt 25 against the tension of the coil spring 32.

It is thought that the manner in which the device is used will be readily apparent from a consideration of the foregoing. Briefly, with the cover 4 in closed position on the box 1, the latch 24 rests on the keeper 26 for supporting the shelves 16 and 19 in said cover. When the cover is opened, the shelves 16 and 19 are still enclosed thereby, as seen in Fig. 3 of the drawings. To swing the shelves 16 and 19 upwardly to open or operative position, a finger is inserted through the openings 34 and 35 and the latch 24 is retracted against the tension of the coil spring 32 in a manner to clear the keeper 26. With this same finger the shelves 16 and 19 are swung upwardly and the former comes to rest on the hinged edge of the cover 4.

The construction and arrangement is such that the shelves 16 and 19 may be swung to open or closed position without striking or binding. The shelves 16 and 19 are adapted to support a plurality of artificial bait cases 36. Resilient clips 37 on the cases 36 detachably secure said cases to the shelves.

The tray 9 is ordinarily supported in the upper portion of the box 1 on the flanges 8. When access to the box 1 is desired, the tray 9 is raised and moved forwardly and brought to rest on the front 14 of the box. The hooks 13 engage beneath the flanges 8 in a manner to support the tray 9 in the forwardly projecting position seen in Fig. 6 of the drawings.

It is believed that the many advantages of a fishing tackle box constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A fishing tackle box of the character described comprising a box, a cover hingedly mounted on said box, a shelf pivotally mounted in said cover and adapted to be swung outwardly therefrom to operative position when said cover is in open position, and a latch on the shelf engageable with the cover for releasably securing said shelf in inoperative position in the cover, said latch including a substantially U-shaped bolt straddling the shelf and slidable thereon, and a coil spring connected to the shelf and to the bolt for projecting said bolt, the shelf and the bolt having communicating openings therein for the reception of a finger for retracting the bolt and for lifting the shelf to operative position.

2. A fishing tackle box of the character described comprising a box, flanges on certain of the walls of said box, a removable tray in the box including flanges resting on the first-named flanges, a bar on said tray, and downwardly offset hooks on the ends of said bar engageable beneath the flanges for retaining the tray in a horizontally projecting position on the front of the box.

WALTER J. BRUSKE.